Patented Oct. 26, 1943

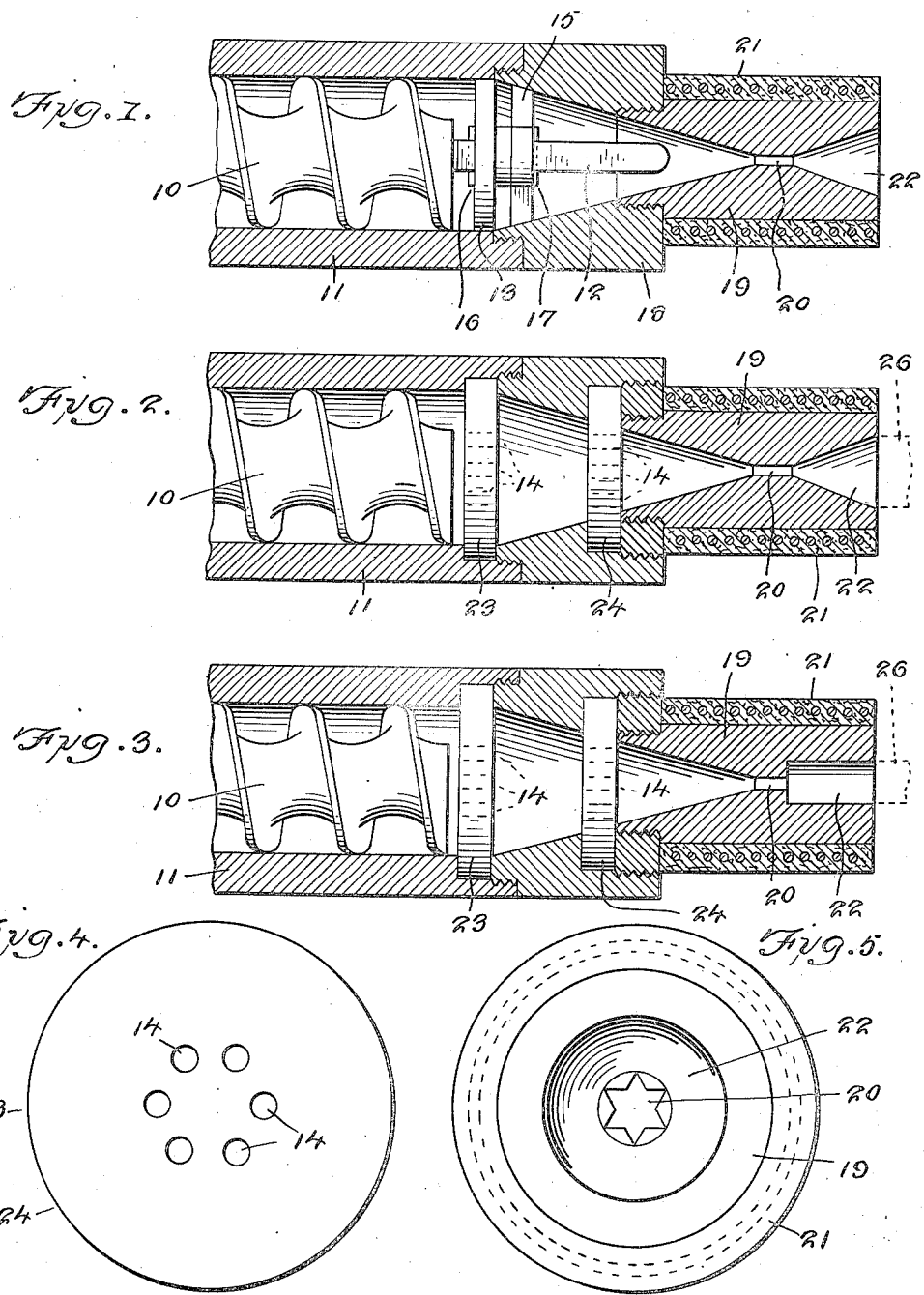

2,332,829

UNITED STATES PATENT OFFICE 2,332,829

PROCESS OF MAKING CASEIN PLASTIC PRODUCTS AND APPARATUS THEREFOR

John A. Parsons and Will E. Vawter, Bainbridge, N. Y., assignors to American Plastics Corporation, New York, N. Y., a corporation of New York Application October 4, 1939, Serial No. 297,947

13 Claims. (Cl. 18—12)

The present invention relates to a process and apparatus for making products showing a pearl effect on the end of an extruded rod of casein plastic (cut off perpendicular to the axis), by means of an extrusion press, which may be a screw-operated extrusion press, whereby a rod may be extruded and objects such as buttons or the like, be turned from the end of such rod, the face of such object or button having as its center the axis of such rod and the face of such object or button clearly showing an iridescent or pearl-like effect. We will hereinafter refer to "buttons" although various similar objects can be made. Discs also can be sliced perpendicularly to the axis of such rod and can later be turned, molded or otherwise formed into buttons, with the iridescent or pearl-like effect showing on the faces thereof. A further object is the elimination of "screen marks" or "screen prints" in the ends of extruded casein plastic rods, which screen marks are more noticeable in the discs cut from rods of a casein plastic containing pigment material of any kind, as ordinarily heretofore made.

The iridescent or pearl-like effect in casein plastics has been known to the art in the past. The iridescent or pearl-like effect in such casein plastics is obtained by the addition to the unextruded, moistened casein, of a small amount of aluminum bronze powder, bismuth oxychloride or like substances. These pigments are of a scale-like or plate-like structure, that is being very thin and having more or less flat surfaces of a light-reflecting character. The fact that the incorporation of such materials into the casein plastic results in the iridescent or pearl-like effect is due to the reflection of light which reflection is caused by the plate-like surface of these materials. The usual method of producing same has been to extrude the moistened casein mixture through a screw-operated extrusion press and cutting small lengths of plastic rods, then, later, laying these on their side and pressing them in a mold to form a sheet, or to extrude a strip or ribbon of casein plastic from which sheet, strip or ribbon, discs are punched and are later either turned or molded into objects such as buttons. Both of these methods are costly, due to the additional expense incurred in molding the sheet and the excessive waste that results from punching discs or irregular shapes from the sheets or ribbon.

Heretofore, it has been impossible to turn buttons having this iridescent or pearl-like effect, directly from the ends of the extruded casein plastic rods. This is because, during the extrusion of a casein plastic rod through a small opening in the front of the extrusion press, the flakes or scales of the aluminum powder or other plate like pigment practically all align themselves in the casein plastic rod in such a manner that they reflect light toward the perimeter of the casein plastic rod only and not towards the ends of said rod. That is to say, the scales in the extruded rod are substantially parallel to the axis of the rod. The faces of the buttons cut from the ends of such rods so that the faces of buttons are perpendicular to the axis of the rod, are of a dark color or "dead" appearance, since there is no reflection of light which gives the iridescent or pearl-like effect, due to the flakes of aluminum powder or the like all reflecting light toward the perimeter of such buttons, instead of reflecting it toward the faces of such buttons.

It is customary to extrude casein plastic rods through a screw-operated extrusion press, into a tapered chamber in the outlet end (commonly called in the art, the "front" of the press), then, through an opening which preferably has paraller sides (i. e. is tubular, although not necessarily circular in cross-section), for a distance of from one-half inch to three inches or more. As the casein plastic rod comes out of this opening it slightly expands, so that the extruded rod might be as much as 25 per cent larger (in cross sectional dimensions) than the opening through which it was extruded. We have now found that, by extending the length of the opening in the front of the extrusion press beyond the section where the opening has parallel sides and simultaneously increasing the cross-sectional area of the opening (whether or not the shape of the opening is changed), this enlarged opening either having parallel sides or coming to the maximum area on a taper, the casein plastic is more or less held back on the perimeter of the rod being extruded, while the flow in the central portion continues, causing the reflecting particles to arrange themselves in the casein plastic rod in such a position that they reflect the light toward the end of the rod instead of toward the perimeter. In other words, the reflecting particles are (in large part) turned to an angle which is more or less perpendicular to the axis of the rod instead of remaining parallel to said axis as is customary, in which new position they reflect light toward the end of the rod instead of toward its perimeter. This gives a rod which (when cut off perpendicular to its axis) shows strongly light-reflecting ends, the periphery of which rod is dull in appearance. It will be understood that by slicing this rod, perpendicular to its axis, into discs, the faces of the discs will be strongly light-reflecting, the edges of said discs being dull in appearance. This appears to be due to the friction of the exterior between the hot casein plastic and the metal of the enlarged portion of the opening.

In the accompanying drawing we have shown a modification of the usual screw-fed extrusion press for use in practicing this invention. In said drawing, Fig. 1 is a vertical longitudinal section showing the front part of the screw and its casing, together with the tapering chamber and the section having parallel sides, which latter is extended in a gradually increasing diameter to a much larger opening than the portion having parallel sides.

The feed screw 10 is carried in casing 11, and is operated, in any suitable manner. 12 is a shaft or projection located axially in the end of the screw 10 and rigidly secured thereto. A circular perforated plate 13 may be carried on the shaft 12 and rotating therewith, this being provided with a row of holes 14, through which the casein mass under treatment is forced. 15 is a rotary impeller and agitating device, which, with the perforations in the plate 13, if used, produces a certain amount of mixing of the materials of the two colors, to give a mottling effect.

The shaft 12 is preferably square in cross section, and the elements 13 and 15 are rigidly attached thereto, by means such as keys 16 and 17.

In some cases it may be advisable to provide a plurality of plates 13 and a plurality of rotary agitators 15, to give the desired fineness of the mottling.

The casing 11 is continued in the blocks 18 and 19 which are firmly attached to each other and to the end of casing 11, thereby constituting a continuation of the casing 11. 20 is the usual opening or outlet, a part of this preferably having parallel sides from which ordinarily the casein mass would be extruded. 22 is the part of the opening which has a gradually increasing diameter which forms the outlet for the extruded rod in this invention. At 21 is illustrated a heating means, such as an electrical heater for controlling the temperature in the inner surface of the block 19, heat applied at 19 helps to give a smooth surface to the extruded rod. The opening 20 can, of course, be circular or can be of another shape such as star-shape or hexagonal or octagonal, to give a rod of the desired shape. This particular arrangement is for extruding a multi-colored spiral mottled casein material.

The apparatus shown in Fig. 2 is the same as Fig. 1, except that, instead of having shaft 12 with the agitator 15 or rotating plate 13, or both, mounted thereon, stationary plates 23 and 24 are provided, which have a hole or several holes drilled through them, the axis of which may be parallel with the axis of the screw. In some cases these plates may be eliminated and no obstruction of any kind placed in the tapered chamber.

The apparatus of Fig. 2 lends itself to the production of rods of a single color (or uncolored) and also for the production of mottled rods. For this latter effect, we can feed moistened casein for the ground color (say white), in the form of moistened casein powder, and then feed a quantity of moistened casein carrying a color (pigment or dye) uniformly distributed therein, and alternating these two feeds. Or we can use alternately the ground color and several mottle colors. The casein for the mottle may be fed as a moistened coarse powder or as tablets or pieces of plasticized casein.

In this case a good mottling is produced on the end of the casein plastic rod, instead of being only on the periphery of the rod.

In Fig. 3 the apparatus is similar to that shown in Fig. 2, except that, instead of having a gradually increasing diameter from 20 to 22, it is shown increased to the maximum cross-sectional area immediately at the exit of 20.

The opening 22, as can be seen from the drawing, may be either just a greatly increased cross-sectional area starting at 20, or this area may be gradually increased by steps until these steps reach infinity or a straight taper.

Fig. 4 shows an end elevation, somewhat enlarged, of the plates 23 and 24 with a single ring of holes 14. The number of holes can be increased or decreased. The holes may be arranged in one or more circles or otherwise, and the shape of the holes may be round or any desired shape.

Fig. 5 is an enlarged elevation of the outlet end of the screw press showing the portion 20, which is 6-pointed star-shaped (in cross section) in this case, opening into a cone-shaped tapering outlet 22. 19 is the outer portion of the front of the machine and 21 shows an electrical heater. Other heating means could be substituted.

Although we do not limit ourselves to the following proportion between the areas of 20 and 22, we have found that, when 22 has a cross-sectional area equal to eight times the cross-sectional area of 20, very good results are obtained. It will be understood that the rod leaving the apparatus will have a diameter (if a round rod is being made) of the outlet end of 22 or possibly a very little greater than this. In starting up the apparatus of Fig. 3 (in which there is a shoulder between 20 and 22), it is advisable to retard the flow of the outgoing casein rod, e. g. by holding a round-headed metal rod against the end of said extruded rod, until the enlarged portion 22 is completely filled with casein plastic. This is not necessary in the apparatus of Figures 1 and 2. 26 shows the rod being formed in Figs. 2 and 3.

We have also discovered that the arrangement and shape of the holes 14 in plates 23 and 24 control the mottle pattern to be seen on the ends of the extruded casein plastic rod. As an example, if we have a cluster of six circular holes in the central portion of the plates 23 and 24 (in the proportions shown in Fig. 4), in combination with the shape of the opening 20, the ends of the extruded casein plastic rods will show a somewhat star-like pattern. A sample turned disc is submitted to illustrate. Different arrangements of circular holes or holes having different shapes with different shapes of the opening 20, will produce many different patterns.

A radial mottle of many lines can be made by using a front plate 24 having a large number of holes arranged in a circle, and a circular opening 20 (in Fig. 2 or Fig. 3).

We have also discovered that, by having a different cross-sectional shape to the tubular portion 20 than the portion 22 has, we can also produce different designs showing on the ends of the extruded casein plastic rod, and on the faces of the discs cut therefrom. As an example, we have made the portion 20 in the shape of a six-pointed star and 22 a gradually increasing cone shape of circular cross section.

We do not limit ourselves to aluminum bronze powder or bismuth oxychloride as light-reflecting agents. These are cited as examples only and there are also mentioned mica, tinsel, plate (flake) graphite, lead phosphate, plates of other metals, e. g. gold or silver, are examples of plate-like reflecting pigments.

As an example of the casein plastic mixture to be extruded in practicing this invention we cite the following: to 200 pounds of commercial casein, preferably rennet casein, (although we do not limit ourselves to rennet casein but may use any casein that can be used in casein plastics), is added enough water so that the total moisture in the moistened casein is from 18 to 35 per cent. With this moistened casein there is mixed from one and one-half pounds to four pounds (i. e. 0.75% to 2% by weight) of aluminum bronze powder or bismuth oxychloride together with such dyes or finely pulverized non-flaky pigments as are desired to result in a satisfactory or desired color. The aluminum bronze powder or any other suitable reflecting agent and the dyes or common pigments, or both, may be added to the commercial casein before the addition of the water. The treatment is then completed as above described.

As an example in practicing the invention, using the apparatus as shown in Fig. 1, for the production of buttons carrying a spiral mottle, the process is conducted as above in combination with the step of alternately feeding differently colored moistened casein mixtures to the feed end of the screw 10, one or more of such mixtures containing flaky light-reflecting pigment. We might feed one color with the reflecting agent or all colors might contain the reflecting agent, but different dyes in the different mixtures.

Heretofore, trouble with "screen marks" has been experienced in making casein rod, these being particularly pronounced in cases in which relatively large amounts of fine pigments are used. This trouble also exists to some extent in making rod for transparent buttons. The rods made under the present invention are relatively free from these marks. Hence better products are produced.

The term "disc-like articles," as used in the appended claims is intended to cover discs, buttons and the like, but the term is not intended to be restricted to articles which are exactly circular.

We have referred above to the part 20 as a tubular portion in the passage between the tapering part of the path of flow of the casein mass and the flaring portion of such path. It is not essential however that a tubular portion should exist, the flaring part of this part can connect directly (without any tubular portion) to the tapering portion, i. e. the two frusto conical surfaces (Figs. 1 and 2) can meet each other, axially of each if desired. There appears to be a venturi effect in the flow of the casein plastic through the narrowest part of the path of travel.

We have referred above to an extrusion press having a feed screw as its propelling means, but this invention is not restricted to the use of such screw. Other types of extrusion presses are well known in the art.

We claim:

1. A process which comprises extruding under heat and pressure, a rod of casein plastic of any desired cross section, and containing homogeneously incorporated therein, a light-reflecting pigment of a somewhat scale-like structure, said rod being composed wholly of plastic composition and pigment, whereby the scales of said pigment tend to arrange themselves approximately parallel to the axis of said rod, and skewing at least a large part of said scales into positions approximately perpendicular to the axis of said rod, whereby the said pigment will reflect light prominently from a smoothly cut end of said rod, cut perpendicular to the axis, and cutting disc-like articles from the end of said rod at approximately right angles to its axis, the smallest dimension of said disc-like articles being measured along the axis of said rod.

2. A process of making disc shaped articles from casein as a base which discs have a pearly or iridescent appearance on their faces, which process comprises the step of extruding a casein plastic mixture containing a flake-form pigment homogeneously incorporated therein, which can give the casein plastic a pearly appearance, such extrusion involving passage of such plastic composition containing such pigment through the entire cross section of a tubular portion of an extrusion nozzle which is of approximately uniform cross-section, followed by an enlarged portion thereof, the enlargement being sufficient to turn a large part at least of the flakes of said pigment into positions nearly perpendicular to the axis of said rod, and cutting disc-like articles from the end of said rod at approximately right angles to its axis, the smallest dimension of said disc-like articles being measured along the axis of said rod.

3. A process of making disc shaped articles from casein as a base which have a pearly or iridescent appearance on their faces, which comprises the step of extruding a casein plastic mixture containing a flake-form light-reflecting pigment homogeneously incorporated therein, such extrusion operation including at near the end of such operation, the step of utilizing frictional contact of the material being extruded with the walls of the passage in the press, to cause a part at least of the flake-form pigment particles to assume positions which, viewed on the end of the rod of material as extruded, will present greater light-reflection than does the side of said rod, and slicing the rod so extruded at approximately right angles to its axis, into disc shaped articles, the smallest dimension of which articles is measured along the axis of the rod.

4. A process of making casein plastics by extrusion of a plasticized casein mass, containing homogeneously incorporated therein, a pigment of scale-like structure, through a nozzle, which comprises causing the casein plastic to flow first through a constricted portion of the nozzle, while said plastic fills the entire cross-section of such constricted portion, then causing said plastic to flow through an enlarged portion of the nozzle while filling the entire cross-section of the enlarged portion of said nozzle, and then causing the plastic to emerge from the nozzle in the form of a rod, and cutting disc-like articles from the end of said rod at approximately right angles to its axis, the smallest dimension of said disc-like articles being measured along the axis of said rod.

5. A process which comprises extruding a casein plastic rod, carrying pigment of a somewhat scale-like structure and capable of giving the plastic a pearly iridescent appearance and which pigment is homogeneously distributed in at least a part of said plastic, and causing at least a substantial part of the pigment particles to present flat surfaces approximately perpendicular to the direction of extrusion of the rod, at the end of the extrusion step, whereby a smoothly cut end of said rod shows the pearly iridescent appearance, and cutting disc-like articles from the end of said rod at approximately right angles to its axis, the smallest dimension of said disc-like articles being measured along the axis of said rod.

6. A casein plastic rod which has intimately and homogeneously incorporated therein, particles of flake-form pigmentary material with flat surfaces thereof arranged in large part at least, approximately perpendicular to the axis of said rod, a flat end of said rod exhibiting greater reflection of light than the side of said rod.

7. In the process of claim 4, alternately feeding batches or increments of casein of a given color and casein of another color, whereby the extruded rod will carry a mottle visible on its end.

8. In the process of claim 4, alternately feeding batches or increments of moistened casein powder having the base color desired, and pieces of plasticized casein mass of a different color.

9. An extrusion press constructed and arranged for extruding a casein plastic rod, said press having a passageway extending therethrough, means in said passageway for forcing a plasticized casein mass carrying a flake form pigment through a portion of the length of said press, which portion is of substantially uniform internal diameter, a portion of said passageway in which the walls taper internally, and a nozzle portion in said passageway, a mottle shaping element located wholly within said tapering portion, said nozzle portion including a substantially tubular portion of substantially uniform internal cross sectional area, followed by a portion of substantially round internal cross-section, which latter portion has an internal diameter several times greater than the internal diameter of said tubular portion, said forcing means, said internally tapering portion, said tubular portion of the nozzle and said portion of substantially round cross section being arranged in the order enumerated.

10. An extrusion press constructed and arranged for extruding a casein plastic rod of homogeneous cross section, means therein for forcing through a portion of the length of the press, a plasticized casein mass, alone, said press having a nozzle, following said forcing means, which includes a substantially tubular portion of a star-shaped cross section, followed by a portion substantially round in cross-section and of several fold greater diameter than said tubular portion, said elements being enumerated in the order of travel of the plastic material through the press.

11. A process of making casein plastics by extrusion in a plastic state through a nozzle, which comprises causing the casein plastic containing flake-form metallic pigment intimately mixed therewith, to flow, when near the exit of the nozzle, first through a constriction in said nozzle, and then causing the same to flow through a part of said nozzle of enlarged cross section, said casein plastic mass by itself filling substantially the entire cross-sectional area of said nozzle throughout all of its flow through said nozzle, the diameter of the part of the nozzle of enlarged cross section being several times greater than the diameter of said constriction, and cutting disc-like articles from an end of the so produced rod, such cutting being substantially at right angles to the axis of said rod.

12. A process of making disc shaped articles from casein as a base, which articles have a shaped mottle on their faces and which have a pearly or iridescent appearance on their faces which comprises feeding to an extrusion press, separately, differently colored portions of moist moldable casein mass, at least a part of said portions carrying a flake-form light reflecting pigment intimately incorporated therein, and at least a part of said portions carrying a coloring agent intimately incorporated therein, causing the casein base material to travel through such extrusion press while allowing not more than a partial blending of the differently colored portions, causing such extrusion operation including at near the end of such operation, the step of utilizing frictional contact of the material being extruded with the walls of the passage in the press, to cause a part at least of the flake-form pigment particles to assume positions which, viewed on the end of the rod of material as extruded, will present greater light-reflection than does the side of said rod, and slicing the rod so extruded at approximately right angles to its axis, into disc shaped articles, the smallest dimension of which articles is measured along the axis of the rod.

13. A process as covered in claim 2, in which the cross section of said tubular portion of the extrusion nozzle is a rectilinear figure.

JOHN A. PARSONS.
WILL E. VAWTER.